United States Patent [19]

Boonstra et al.

[11] 4,277,542

[45] Jul. 7, 1981

[54] RESISTANCE MATERIAL

[75] Inventors: Alexander H. Boonstra; Cornelis A. H. A. Mutsaers; Franciscus N. G. R. van der Kruijs, all of Eindhoven, Netherlands

[73] Assignee: U.S. Philips Corporation, New York, N.Y.

[21] Appl. No.: 74,598

[22] Filed: Sep. 12, 1979

[30] Foreign Application Priority Data

Sep. 20, 1978 [NL] Netherlands ........................ 7809554

[51] Int. Cl.[3] ............................................ B32B 15/00

[52] U.S. Cl. ...................................... 338/308; 156/89; 252/518; 428/432; 423/593; 338/309; 428/471; 428/697

[58] Field of Search ............... 428/539, 426, 432, 457, 428/469, 472; 252/518, 521; 427/101-103; 423/593; 156/89; 338/308, 309

[56] References Cited

U.S. PATENT DOCUMENTS

| | | | |
|---|---|---|---|
| 3,374,185 | 3/1968 | Nitta et al. | 423/593 X |
| 3,553,109 | 1/1971 | Hoffman | 423/593 X |
| 3,681,262 | 8/1972 | Bouchard | 252/521 X |
| 4,019,168 | 4/1977 | Collins | 428/539 X |
| 4,107,387 | 8/1978 | Boonstra et al. | 428/539 X |
| 4,145,470 | 3/1979 | Matsuura | 427/102 |

*Primary Examiner*—George F. Lesmes
*Assistant Examiner*—E. Rollins Buffalow
*Attorney, Agent, or Firm*—Norman N. Spain

[57] ABSTRACT

Resistance material consisting of a mixture of metal oxidic compounds, metal oxides, a permanent binder and a temporary binder, the resistance-determining component consisting of barium-rhodate $BaRh_6O_{12}$. This component has a linear positive temperature coefficient of the resistance (TCR) and enables the production of a resistor having a very low TCR by combining the material with a material having a negative TCR. The resistor is obtained by firing this resistance material after it has been applied onto a substrate.

5 Claims, No Drawings

RESISTANCE MATERIAL

The invention relates to a resistance material consisting of a mixture of one or more metal oxidic compounds, a permanent and a temporary binder, one or more metal oxides and, possibly, a metal, the material containing a metal-rhodate as the resistance-determining component, and to a resistor consisting of the resistance material providing onto a substrate and from which the temporary binder has been removed by heating and provided with leads.

U.S. Pat. No. 4,107,387 describes such a resistance material in which the resistance-determining component is a metal-rhodate defined by the composition $M_3Rh_7O_{15}$, M preferably being Pb or Se.

The advantage of this compound relative to many previously suggested oxidic compounds for use as the resistance-determining component in resistance material is that it is a completed-reaction product which, with a permanent binder and, possibly, together with a different resistance-determining component having a different temperature dependency can be assembled in a simple manner on a suitable substrate to form a resistor body. Prior to that resistance pastes were in common usage from which the resistance-determining component was not obtained until firing thereof on a substrate and by reaction with a vitreous binder, for example a lead oxide glass. This required rather long firing times (for example half an hour) at a relatively high temperature (approximately 800° C.).

A further advantage is the linear negative temperature coefficient of the resistance (TCR) of this material, which temperature behaviour is rare. Combining this material with the much commoner material having a linear positive temperature coefficient enables the production of resistors having a very low TCR ($/TCR/<100\times10^{-6}/°$ C. temperature range—100° to +200° C.).

The invention furnishes a resistance-determining material having a linear positive TCR, also of the rhodate type, which can be assembled together with material having a linear negative TCR into resistors having a low TCR ($/TCR/<100\times10^{-6}/°$ C.).

According to the invention the resistance material is characterized in that the resistance-determining component consists of barium rhodate defined by the composition $BaRh_6O_{12}$.

Surprisingly, it was found that whereas it was impossible to prepare the barium rhodate in conformity with the composition and the properties stated in the above-mentioned U.S. Pat. No., there is a barium rhodate defined by the composition $BaRh_6O_{12}$ which has a positive, linear TCR and a totally different crystal structure and an elementary cell of a totally different structure than the known rhodate.

As mentioned above it is possible to assemble resistance bodies having a low TCR value and having a component with a negative linear TCR as the second resistance-determining component.

In accordance with a further elaboration of the invention a metal rhodate $M_3Rh_7O_{15}$, wherein M is preferably Pb or Sr in accordance with the above-mentioned U.S.-Specification, is used for the component with the negative linear TCR.

The resistance body is produced with material in accordance with the invention by mixing the resistance-determining component(s) with a permanent binder and an organic temporary binder which can be removed by means of firing. After this mixture has been applied onto a substrate, the temporary binder is volatilized and/or decomposed by heating, the permanent binder ensuring cohesion by melting, softening or sintering. The permanent binder, is preferably, a low-melting glass but may also be a synthetic resin material.

The invention will now be further explained with reference to the following examples.

Barium-rhodate and lead-rhodate are prepared by heating a mixture of BaO and $Rh_2O_3$ in a molar ratio 1:3, and PbO and $Rh_2O_3$ in a molar ratio 6:7, respectively, in air for 1 hour at 1000° C. and 3 hours at a temperature of 700° C., respectively, cooling the reaction product out aimed and grinding it to an average grain size of 0.2 μm.

Mixtures of these powders are mixed in different ratios with glass powder having an average particle size of 1 μm and thereafter processed into a paste by means of benzylbenzoate and ethyl cellulose.

The glass powders employed had the following compositions, expressed in a percentage per weight:

| | 1 | 2 | 3 |
|---|---|---|---|
| PbO | 74.0 | 53.5 | — |
| BaO | — | 18.3 | 42.1 |
| $SiO_2$ | 18.6 | 20.2 | — |
| $B_2O_3$ | 5.0 | 5.4 | 57.9 |
| $Al_2O_3$ | 2.4 | 2.6 | — |

The pastes are spread on alundum plates which are dried in the air and thereafter fired in air for 15 minutes. The layer obtained is 15 μm thick.

The following table shows some mixing ratios and the results obtained therewith. Herein m represents the weight ratio $BaRh_6O_{12}$:$Pb_3Rh_7O_{15}$ and n the glass content of the total oxidic mixture (without temporary binder) in a percentage by weight.

| glass type | m | n(wt. %) | R/□ (kΩ) | TCR ($10^{-6}$/°C.) |
|---|---|---|---|---|
| 1 | 1:1 | 50 | 0.85 | +80 |
| 1 | 2:1 | 66 | 1.1 | +20 |
| 1 | 5:1 | 80 | 45 | −70 |
| 2 | 1:1 | 66 | 0.6 | 0 |
| 2 | 2:1 | 75 | 2.2 | −50 |
| 2 | 7:1 | 85 | 23 | +10 |
| 3 | 5:2 | 50 | 1.2 | +80 |
| 3 | 4:1 | 66 | 2.5 | +20 |
| 3 | 5:1 | 85 | 310 | −50 |

What is claimed is:

1. A resistance material consisting essentially of a mixture of at least one metal oxidic compound, a permanent binder and a temporary binder, at least one metal oxide and, as a resistance determining component, a barium-rhodate of the formula $BaRh_6O_{12}$.

2. The resistance material of claim 1 wherein in addition there is present a metal rhodate having a negative temperature coefficient of the resistance (TCR) in such a quantity that a desired level of TCR is achieved.

3. A material as claimed in claim 2, characterized in that the component having a negative TCR is a metal-rhodate of the formula $M_3Rh_7O_{15}$, where M=Pb or Sr.

4. A resistor formed by applying the resistance material of claim 1 to a substrate, heating said resistance material to a temperature sufficiently high to remove said temporary binder and to cause said permanent binder to adhere to said substrate thereby uniting said substrate and said resistance material into a coherent body and providing said coherent body with electrically conductive leads.

5. A novel compound having the formula $BaRh_6O_{12}$.

* * * * *

UNITED STATES PATENT AND TRADEMARK OFFICE

CERTIFICATE OF CORRECTION

PATENT NO. : 4,277,542

DATED : July 7, 1981

INVENTOR(S) : ALEXANDER H. BOONSTRA ET AL

It is certified that error appears in the above—identified patent and that said Letters Patent is hereby corrected as shown below:

Claim 3, Line 3, change "where" to --wherein--

Signed and Sealed this

*Thirtieth* Day of *November 1982*

[SEAL]

*Attest:*

GERALD J. MOSSINGHOFF

*Attesting Officer* *Commissioner of Patents and Trademarks*